US012664879B2

(12) United States Patent
Rosales

(10) Patent No.: US 12,664,879 B2
(45) Date of Patent: Jun. 23, 2026

(54) CHANNEL MULTIPLIER REMOTE CONTROL SYSTEM

(71) Applicant: Gibsonjis B. Rosales, San Jose (PH)

(72) Inventor: Gibsonjis B. Rosales, San Jose (PH)

( * ) Notice: Subject to any disclaimer, the term of this patent is extended or adjusted under 35 U.S.C. 154(b) by 137 days.

(21) Appl. No.: 18/712,220

(22) PCT Filed: Oct. 13, 2022

(86) PCT No.: PCT/PH2022/050017
§ 371 (c)(1),
(2) Date: May 21, 2024

(87) PCT Pub. No.: WO2023/096506
PCT Pub. Date: Jun. 1, 2023

(65) Prior Publication Data

US 2026/0004654 A1 Jan. 1, 2026

(30) Foreign Application Priority Data

Nov. 24, 2021 (PH) .............................. 22021051377

(51) Int. Cl.
*G08B 21/00* (2006.01)
*G08C 17/02* (2006.01)

(52) U.S. Cl.
CPC ......... *G08C 17/02* (2013.01); *G08C 2201/42* (2013.01)

(58) Field of Classification Search
CPC ............................ G08C 17/02; G08C 2201/42
USPC ........................................................ 340/12.5
See application file for complete search history.

(56) References Cited

U.S. PATENT DOCUMENTS

| | | | | |
|---|---|---|---|---|
| 2,327,429 | A * | 8/1943 | Hull | G11B 17/22 341/17 |
| 3,692,949 | A | 9/1972 | Jovic | |
| 2010/0222096 | A1 * | 9/2010 | Griffin | H04M 19/04 455/550.1 |
| 2019/0013960 | A1 | 1/2019 | Sadwick | |
| 2021/0098214 | A1 | 4/2021 | Carlson et al. | |
| 2023/0005674 | A1 * | 1/2023 | Dong | G08C 17/02 |

FOREIGN PATENT DOCUMENTS

AU 2021103729 A4 8/2021

* cited by examiner

*Primary Examiner* — Mark S Rushing
(74) *Attorney, Agent, or Firm* — Maschoff Brennan

(57) ABSTRACT

A remote wireless system is presented to increase the output channels through implementation of cascaded multiplier stages. The output channels are used to control a larger number of devices and appliances by switching on and off through a wireless remote controller. The system comprises a transmitter, a receiver, a first multiplier stage, a second multiplier stage, one or more multiplier stages each cascaded to the prior multiplier stage, and a power supply. Flexible sheets, rotatable swing arms, motors, relays, and self-locking switches are used in combination to achieve the object of the present utility model.

4 Claims, 10 Drawing Sheets

CHANNEL MULTIPLIER REMOTE CONTROL SYSTEM

TECHNICAL FIELD OF THE INVENTION

The present invention generally relates to a remote control system. Specifically, it relates to channel multipliers for increasing output channels of a wireless or remote control system.

BACKGROUND OF THE INVENTION

There is a need to control a larger number of devices or appliances by a wireless remote controller with limited transmission channels. Presently, for example, a 16-channel system can only control 16 devices. Thus, a one-to-one input-output system. The present invention aims to address this by providing a channel multiplier comprising matrices of horizontal and vertical wired connections arranged to provide intersecting crosspoint output switches. One example application of the present invention is controlling wirelessly the light bulbs (i.e., 1000 or more) of a building with a single RF remote controller.

U.S. Pat. No. 3,692,949A discloses an electronics switching network for providing a plurality of possible paths for connecting two subscribers through the said network. The network comprises a plurality of cascaded stages of crosspoint switches-matrices of horizontal and vertical connections arranged to provide intersecting crosspoints. Each of these matrices are cascaded by links joining the outlets of one matrix to the inlets of the next succeeding matrix. In short, a single path connecting two subscribers can be completed via a series circuit including a single crosspoint switch in each cascaded stage.

SUMMARY OF THE INVENTION

It is an object of the present invention to provide a system for increasing output channels of a wireless transmission system by use of cascaded channel multiplier stages. In the exemplified embodiment of the present invention, the system comprises a transmitter, a receiver, a n-stage channel multiplier, and a power supply. The n-stage multiplier comprises flexible sheets, rotatable arms, motors, and self-locking switches. In embodiments with more than one stage channel multiplier, the subsequent multiplier stages are each cascaded to the prior stage.

DETAILED DESCRIPTION OF THE INVENTION

Figure 1:
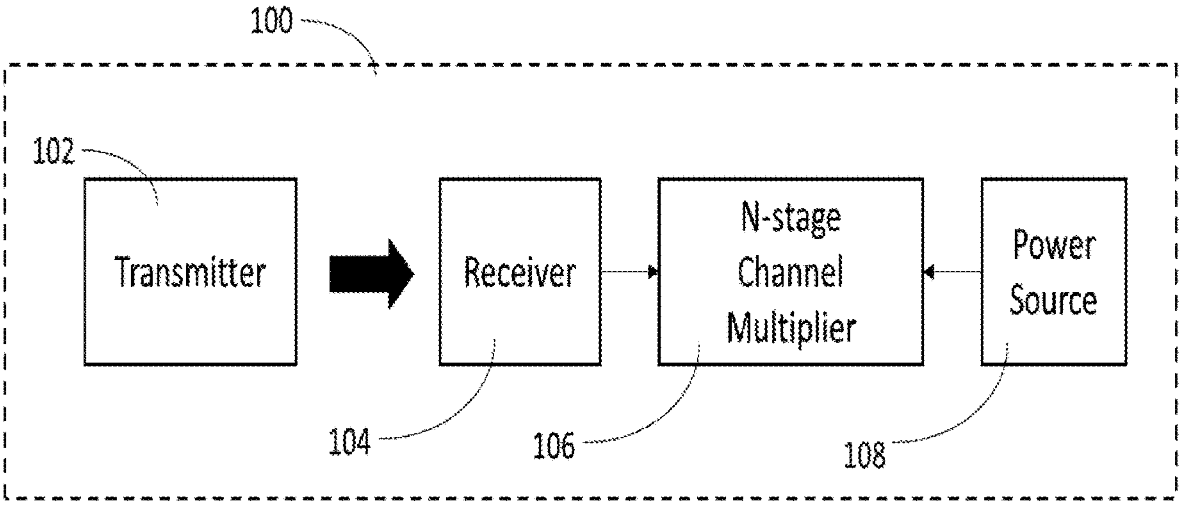
FIG. 1 shows the block diagram of the channel multiplier remote control system for increasing output channels of a wireless transmission system according to a preferred embodiment of the present invention.

As shown in FIG. 1, the channel multiplier remote control system 100 comprises a transmitter 102, a receiver 104, an N-stage channel multiplier 106, and a power source 108 in accordance with the preferred embodiment of the present invention. The N-stage channel multiplier 106 includes at least one stage channel multiplier for increasing the output channels of the remote control system. In normal operation, a 16-channel remote control system can only send command signals through the 16 output channels. With the present invention, more output channels can be utilized, for example, for controlling a number of devices and appliances more than the input channels. Thus, a one-to-many input-output system. The channel multiplier increases the original number of channels stage by stage and follows the following formula 1:

$$\left(\frac{\text{num of input channels}}{2}\right)^2 = \text{num of output channels} \quad [1]$$

Figure 2:
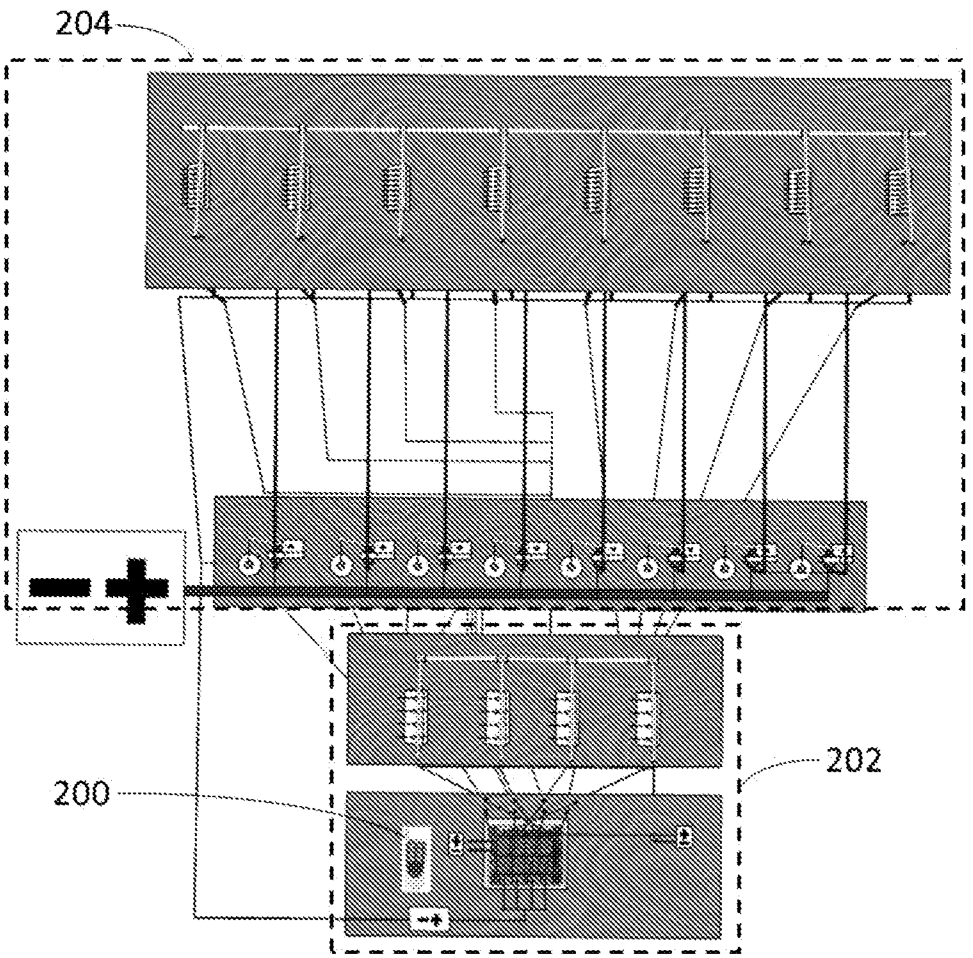
FIG. 2 shows the wiring diagram of a two-stage multiplier system.
Figure 3A:
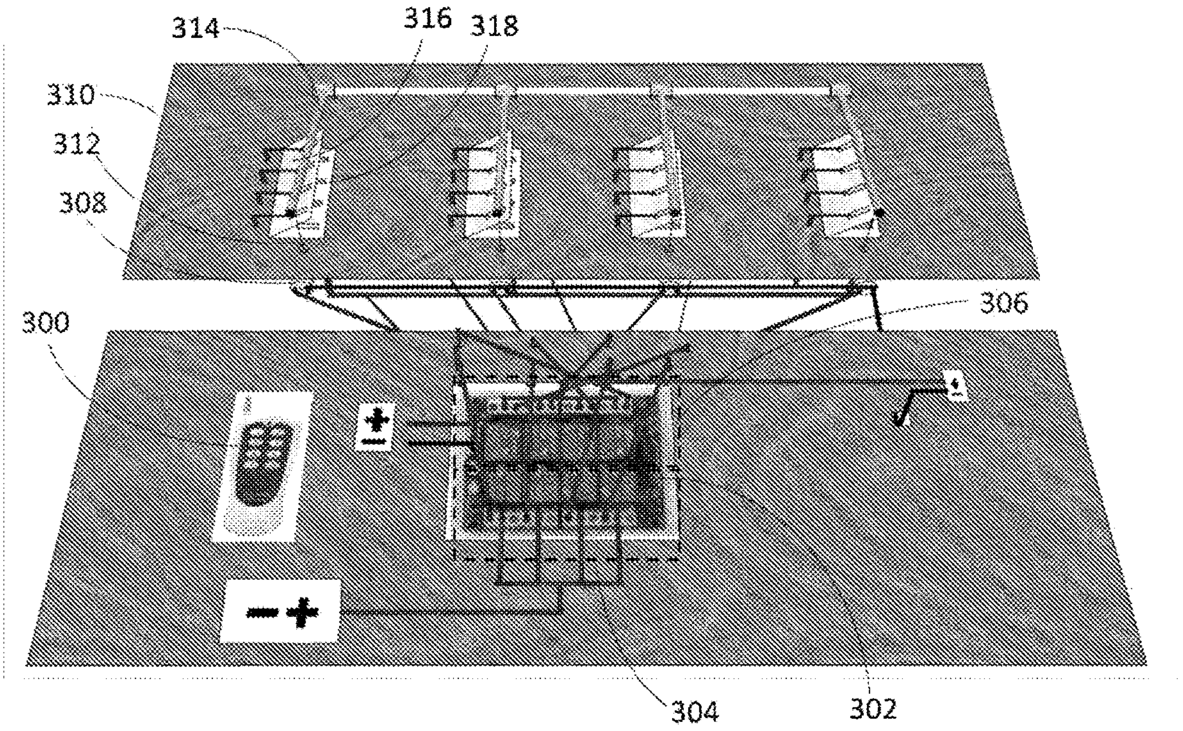
FIG. 3A illustrates the first stage of the two-stage multiplier system shown in FIG. 2.
Figure 3B:
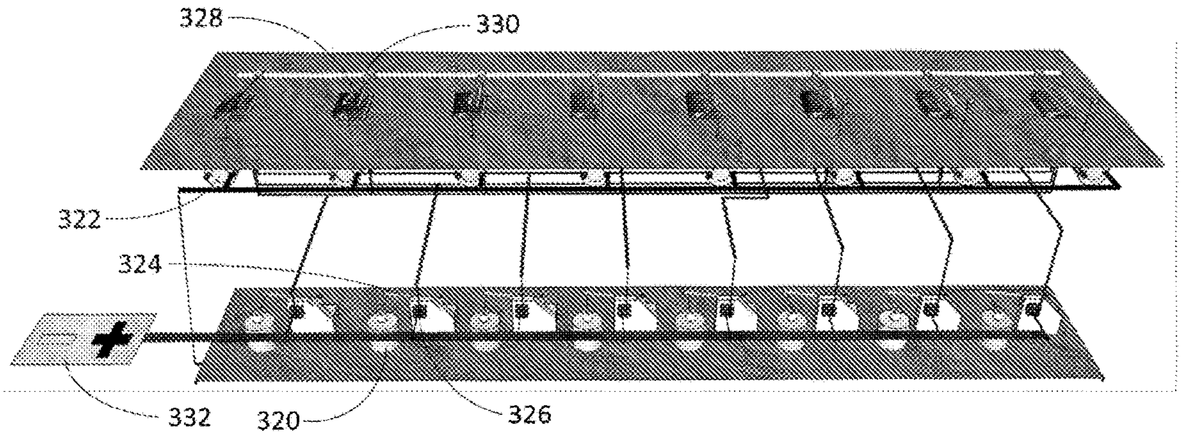
FIG. 3B illustrates the second stage of the two-stage multiplier system shown in FIG. 2.

FIG. 2 shows the wiring diagram of an 8-input channel, two-stage multiplier system having a receiver 200, a first multiplier stage 202, and a second multiplier stage 204. In close perspectives, FIGS. 3A and 3B illustrate the first stage and second stage of the two-stage multiplier system shown in FIG. 2, respectively. In FIG. 3A, the transmitter (remote controller) 300 is configured to send a command signal to the receiver 302. The plurality of relays (304, 306) housed within the receiver 302 is then configured to switch on or off in response to the received signal. The normally open connections of half of the relays 304 are configured to split into parallel connections while the other half 306 are connected to the motors 308 placed under the board 310. When a motor 308 is actuated by a relay 306, the motor 308 will pull the string 312 attached to a rotatable swing arm 314, which causes the flexible sheet 316 to close the connection between the electrodes 318 from both of its sides. Here, each flexible sheet has 4 electrodes on each side. Electrodes 318 in the active state (closed connection) act as a switch (output channel) for controlling an output device or appliance. In effect, the original 8 input-output channels are augmented to 16 output channels.

To increase the 16 output channels, the second stage multiplier in FIG. 3B can be connected to the first stage multiplier in FIG. 3A. The output channels 318 from the first stage multiplier are configured to actuate all the motors (motors in row 320 and 322) in the second stage multiplier. The first row of motors 320 is configured to pull the string attached to a rotatable arm 324, which in turn presses the self-locking switch 326. The output connections of the self-locking switches 326 are then split into parallel connections to each row of the flexible sheets 328. When actuated by an output channel 318, the second row motors 322 will pull the string attached to the second row rotatable arms 330, which pushes the flexible sheets 328 to close the connection between the electrodes from both of its sides. Each active electrode then acts as a switch, which draws power from the power supply 332 and delivered through the self-locking switch 326. In the second stage, each flexible sheet 328 has 8 electrodes on each side. Hence, from the original 8-channel receiver, the output channels are increased to 16 channels in the first stage and further multiplied to 64 output channels in the second stage.

Figure 4:
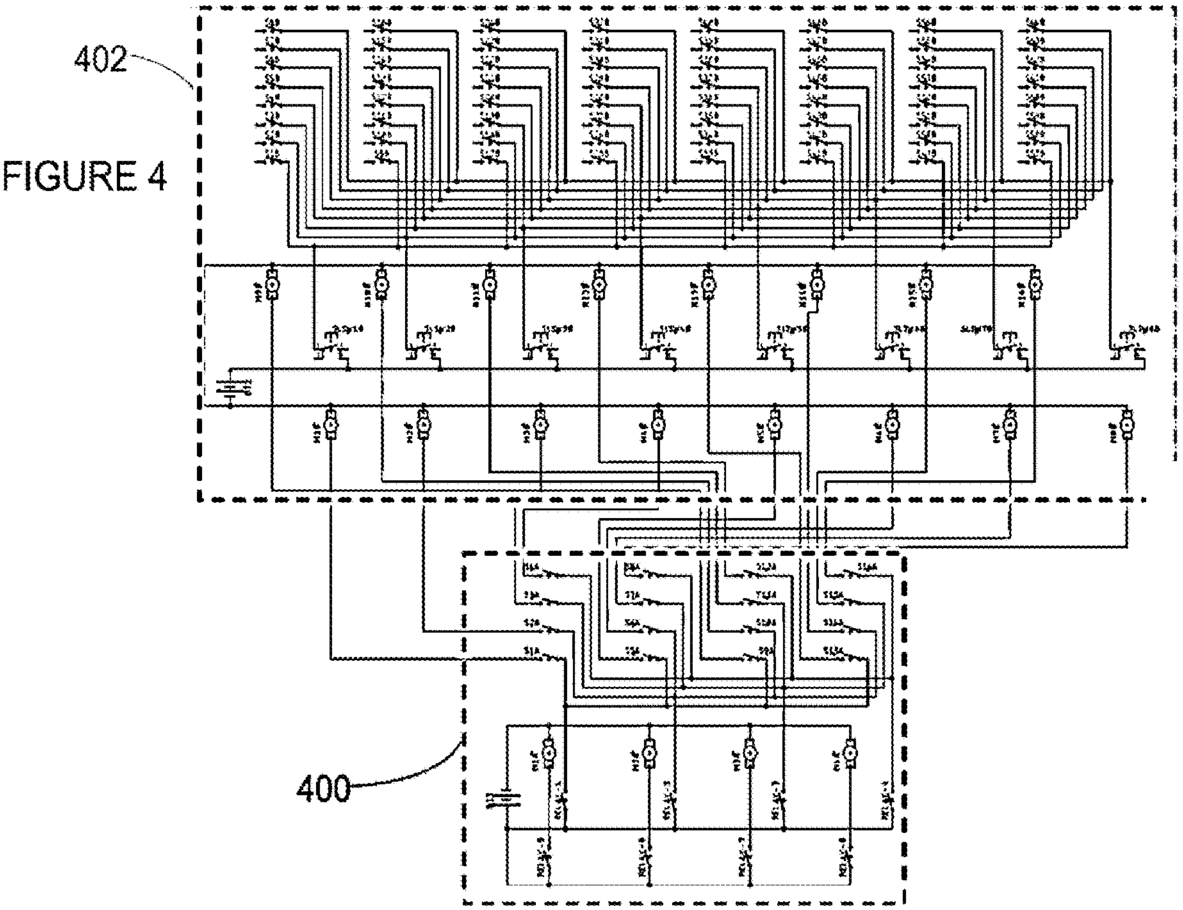
FIG. 4 shows the schematic diagram of a two-stage multiplier system.
Figure 5A:
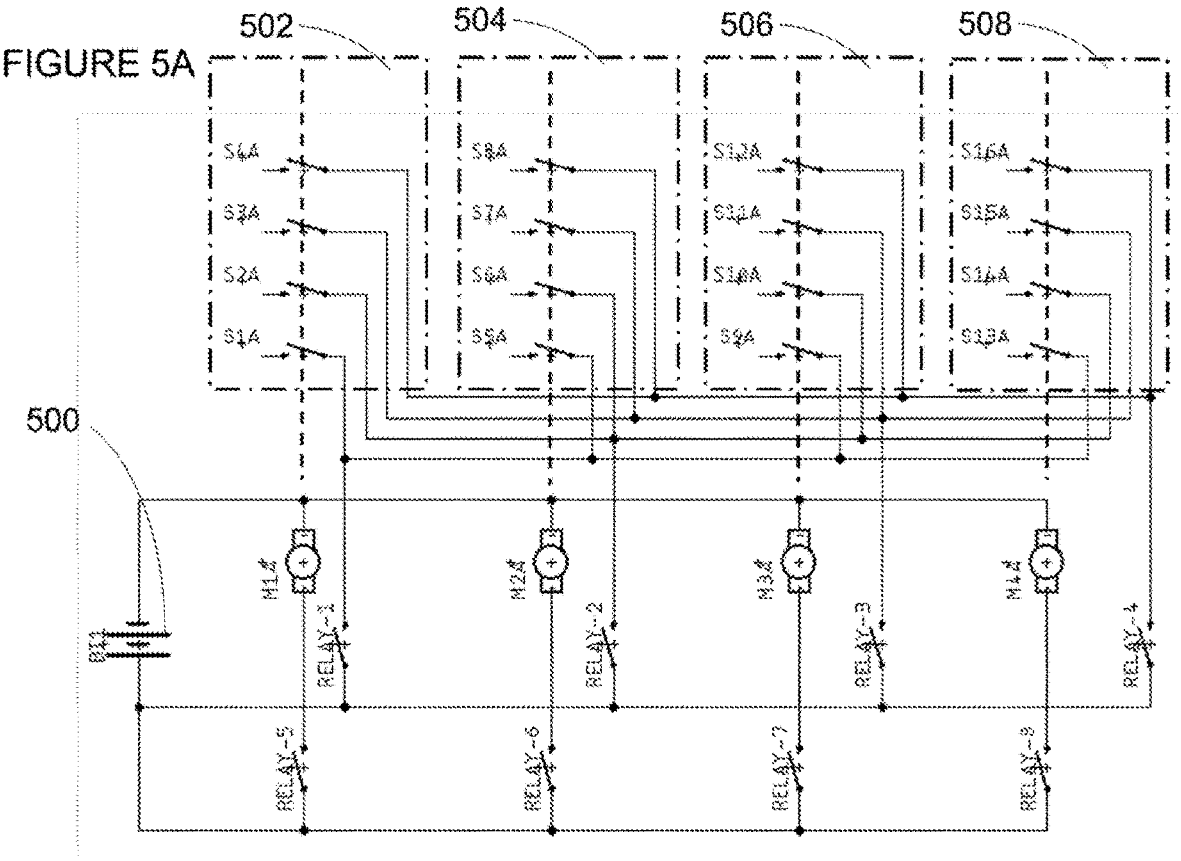
FIGS. 5A and 5B illustrate the first stage and second stage of the two-stage multiplier system shown in FIG. 4, respectively.

The schematic diagram of the two-stage multiplier system is also shown in FIG. 4. The first-stage 400 and second-stage multipliers 402 will be discussed in detail in FIGS. 5A and 5B, respectively. In FIG. 5A, the receiver controls the activation of the relays (relays 1-8), which draws power from the power supply 500 (e.g., battery, electric outlet). The normally open connections of the first group of relays (relays 1-4) are split into parallel connections, which come in contact with the electrodes of one side of the flexible sheets (502, 504, 506, 508). For example, the normally open connection of relay 1 is split into the first row electrodes (S1A, S5A, S9A, S13A) on one side of the flexible sheets (502, 504, 506, 508). In another example, the normally open connection of relay 2 is split into the second row electrodes (S2A, S6A, S10A, S14A) on one side of the flexible sheets (502, 504, 506, 508). Relays 3 and 4 follow the same configuration. On the other hand, the second group of relays (relay 5-8) is used to actuate the motors 1A-4A. The motors 1A-4A are then configured to activate the switches (S1A-S16A) column-wise by pulling the flexible sheets (502, 504, 506, 508), which closes the connection between the electrodes. For example, relay 5 can switch on motor MIA to close the switches S1A, S2A, S3A, and S4A (electrodes from flexible sheet 502). In another example, relay 6 can switch on motor M2A to close the switches S5A, S6A, S7A, and S8A (electrodes from flexible sheet 504). Therefore, to activate output of switch SIA, command signals from the transmitter must be transmitted by pressing push buttons 1 and 5 to trigger relays 1 and 5 of the receiver, respectively. Power is then delivered from the power source, for example, through relay 1 and switch S1A of the flexible sheet 502. As seen in the diagram, there are 16 output channels from S1A to S16A.

Figure 5B:
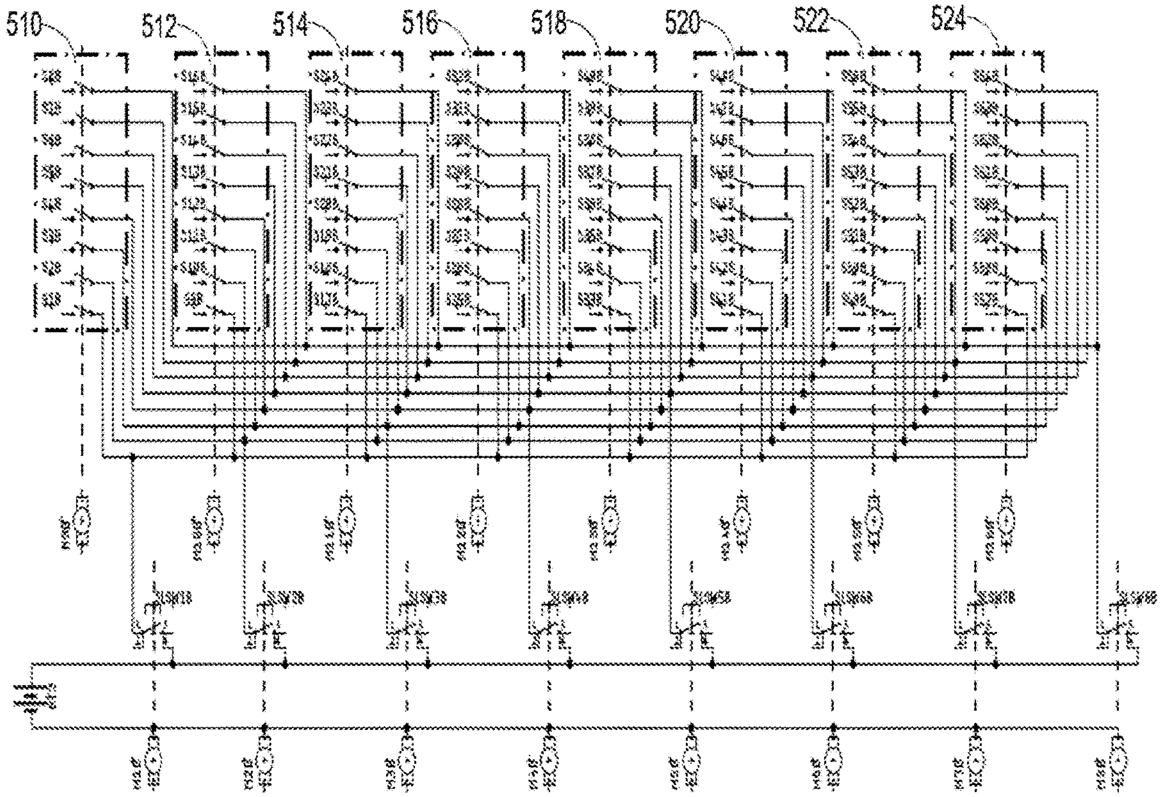

To increase the 16 output channels, the second stage multiplier in FIG. 5B is used. Output connections from switches S1A to S8A are used to trigger motors 1B to 8B, while switches S9A to S16A are used for motors M9B to M16B. Each of the motors MIB to M8B is used to push each of the self-locking switches SLSW1B to SLSW8B, accordingly. Each of the output connections of SLSW1B to SLSW8B are split into parallel connections, which come in contact with the electrodes of one side of the flexible sheets (510, 512, 514, 516, 518, 520, 522, 524). For example, the output connection of self-locking switch SLSW1B is split into the first row electrodes (S1B, S9B, S17B, S25B, S33B, S41B, S49B, S57B) on one side of the flexible sheets (510, 512, 514, 516, 518, 520, 522, 524). In another example, the output connection of self-locking switch SLSW2B is split into the second row electrodes (S2B, S10B, S18B, S26B, S34B, S42B, S50B, S58B) on one side of the flexible sheets (510, 512, 514, 516, 518, 520, 522, 524). Self-locking switches SLSW3B, SLSW4B, SLSW5B, SLSW6B, SLSW7B, and SLSW8B follow the same configuration.

On the other hand, each of the motors M9B to M16B is used to close the switches (SIB to S64B) column-wise by pulling the flexible sheets (510, 512, 514, 516, 518, 520, 522, 524). For example, switch S9A from the first-stage is used to trigger M9B, which, in turn, close the switches SIB to S8B (electrodes from flexible sheet 510). Hence, when two stage multipliers are in use, to activate a single device or appliance, multiple command signals must be transmitted to the receiver to trigger the corresponding relays. For instance, to power output channel 1 or S1B in the second stage, the following command signals must be sent:

TRANSMITTER

PUSH BUTTON 1 + PUSH BUTTON 5

PUSH BUTTON 1 + PUSH BUTTON 7

RECEIVER

RELAY 1 ON + RELAY 5 ON = $SLSW1B$ (LOCKED-ON STATE)

RELAY 1 ON + RELAY 7 ON = $S1B$ (POWER ON)

To select another output device, SLSW1B may be unlocked or powered off first. Push buttons 1 and 5 can be pressed down to put SLSW1B in the "OFF" state. To power output channel 2 or S2B in the second stage:

TRANSMITTER

PUSH BUTTON 2 + PUSH BUTTON 5

PUSH BUTTON 1 + PUSH BUTTON 7

RECEIVER

RELAY 2 ON + RELAY 5 ON = $SLSW2B$ (LOCKED-ON STATE)

RELAY 1 ON + RELAY 7 ON = $S2B$ (POWER ON)

In this embodiment, the original 8-channel has been multiplied to 64 output channels by using a two-stage multiplier. Following formula 1, output channels can be increased further to 1024 channels by adding a third-stage multiplier.

Figure 6A:
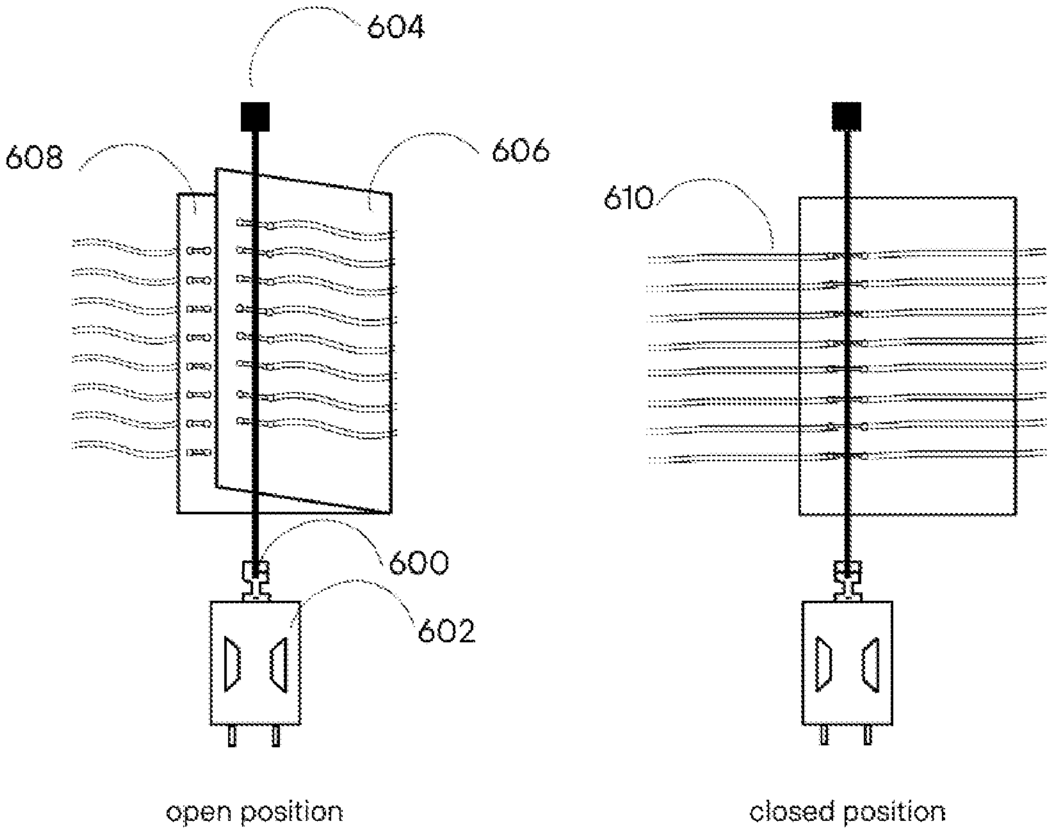
FIGS. 6A and 6B show the top and side views of the motor actuator mechanism, respectively.
Figure 6B:
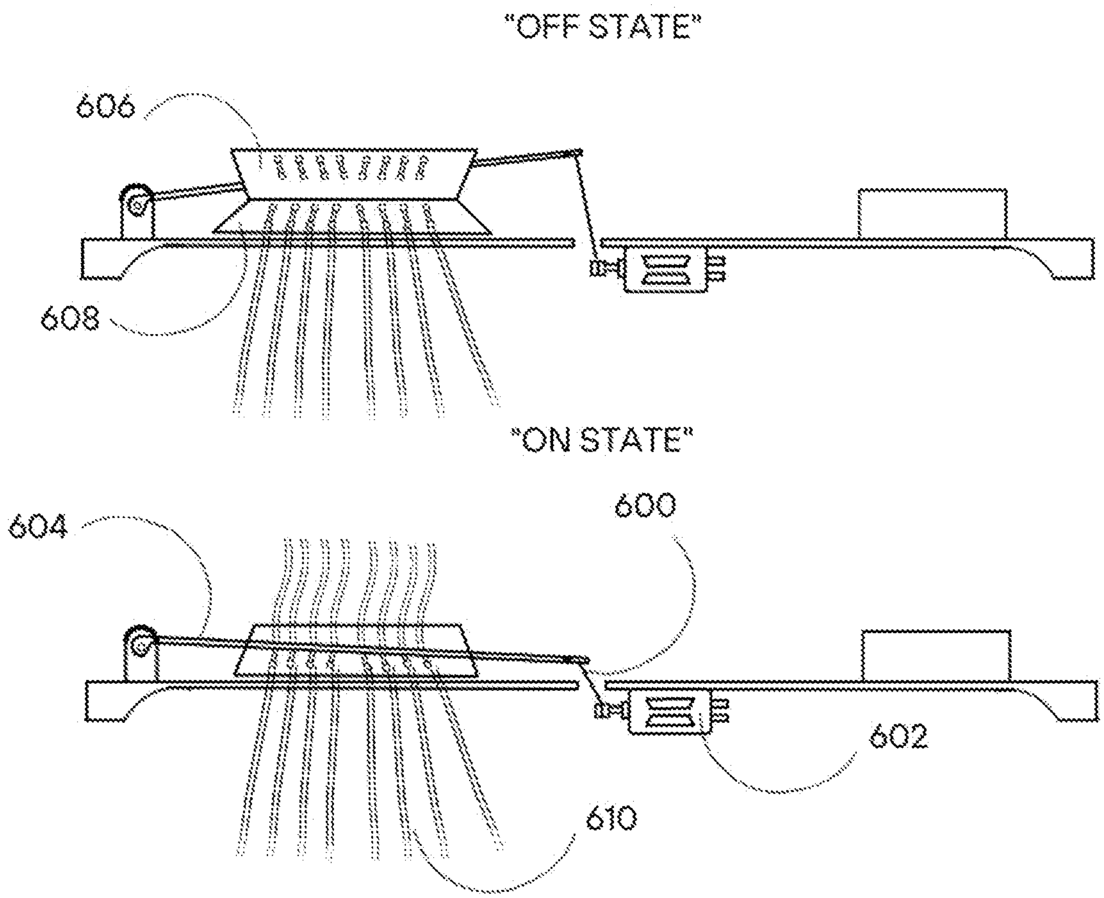

The top view and side view of the motor actuator mechanism for connecting the electrodes of each side of a flexible sheet are shown in FIGS. 6A and 6B, respectively. In FIG. 6A, the open ("OFF" state) and closed positions ("ON" state) are illustrated. A string 600 is tied up to the pulley of the motor 602 and to one end of the rotatable swing arm 604. As the motor 602 shifts from "OFF" to "ON" state, the motor 602 pulls the string 600 towards it. This also pulls the length of the swing arm 604 that pushes the top side 606 of the flexible sheet towards its bottom side 608. The wires or electrodes from both sides then come in contact with each other; and hence, current will flow through the output channels 610 of the flexible sheet.

Figure 7A:
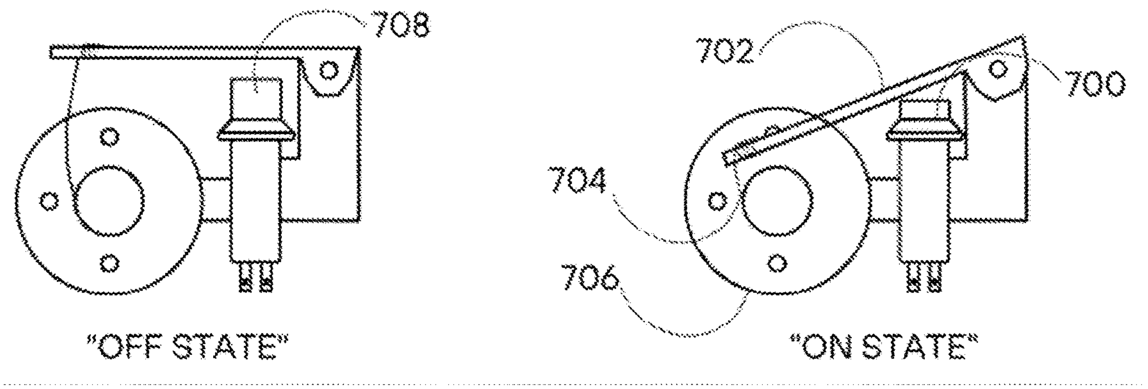
FIGS. 7A and 7B illustrate the front-view and top-view of the self-locking switch mechanism, respectively.
Figure 7B:
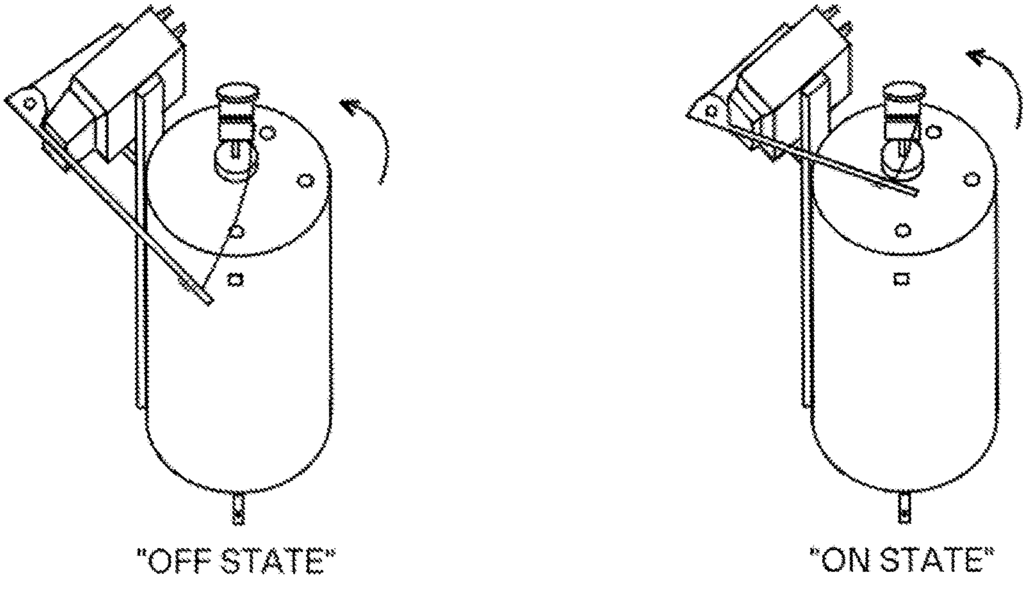

FIGS. 7A and 7B illustrate the front-view and top-view of the self-locking switch mechanism, respectively. The self-locking switch is in "ON" state when it is pressed down (700) by the rotatable arm 702 pulled by a string 704 tied to the motor 706. It is in "OFF" state when not pressed down (708). Here, since the self-locking switch is a type of switch with built-in mechanical lock function, once pushed or pressed down, it will remain locked in that state unless pressed down again.

In accordance with the various embodiments of the present invention, examples of transmission network that can be used include, but not limited to, Wi-Fi, Bluetooth, infrared, radio frequency, NFC, cellular communication, visible light communication, Li-Fi, WiMAX, ZigBee, fiber optic, and other forms of wireless communication channels.

What is claimed is:

1. A system for increasing output channels of a wireless transmission system by use of cascaded multiplier stages comprising:

a transmitter for transmitting a command signal;

a receiver for receiving the transmitted command signal comprising:

a first and second group of relays being switched on or off by the received command signal;

wherein each of the normally open connections of the first group of relays are split into parallel connections;

a first multiplier stage connected to the receiver comprising:

a first set of flexible sheets;

wherein each has electrodes on one side and electrodes on the opposite side; and wherein the electrodes on one side are connected to the split parallel connections;

a first set of rotatable arms adjacent to the first set of flexible sheets and attached with strings on one end point;

a first set of motors;

wherein the second group of relays is configured to switch on the first set of motors to pull the strings resulting to pushing the first set of rotatable arms towards the first set of flexible sheets and closing connections between the electrodes from both sides; and wherein the first group of relays switches on or off the output channel connections through the closed connections of the first set of flexible sheets; and at least one power source electrically connected to the first multiplier stage.

2. The system according to claim 1, wherein the first stage multiplier is connected to a second multiplier stage comprising:

a second set of motors connected to the first half of the output channel connections from the first stage;

a set of self-locking switches, wherein each of the self-locking switch output connections are split into parallel connections;

a second set of rotatable arms attached with strings being pulled by the second set of motors to push the set of self-locking switches;

a second set of flexible sheets;

wherein each has electrodes on one side and electrodes on the opposite side; and wherein the electrodes on one side are connected to the split parallel connections of the self-locking switches;

a third set of motors;

a third set of rotatable arms adjacent to the second set of flexible sheets and attached with strings on one end point; and wherein the second half of the output channel connections from the first stage is configured to switch on the third set of motors to pull the strings resulting to pushing the third set of rotatable arms towards the second set of flexible sheets and closing connection between the electrodes from both sides;

wherein the set of self-locking switches triggers on or off the output channel connections through the closed connections from the second set of flexible sheets.

3. The system according to claim 2 further comprising one or more multiplier stages each cascaded to the preceding multiplier stage.

4. The system according to claim 1, wherein command signals can be transmitted by one wireless technology selected from the group of Wi-Fi, Bluetooth, infrared, radio frequency, NFC, cellular communication, visible light communication, Li-Fi, WiMAX, ZigBee, fiber optic, and other forms of wireless technologies.

* * * * *